July 8, 1941.  O. L. DUPY  2,248,495
REGULATOR
Filed May 17, 1940   3 Sheets-Sheet 1
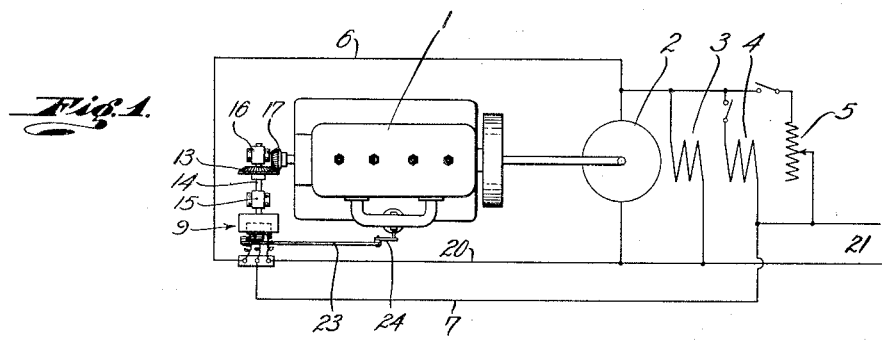
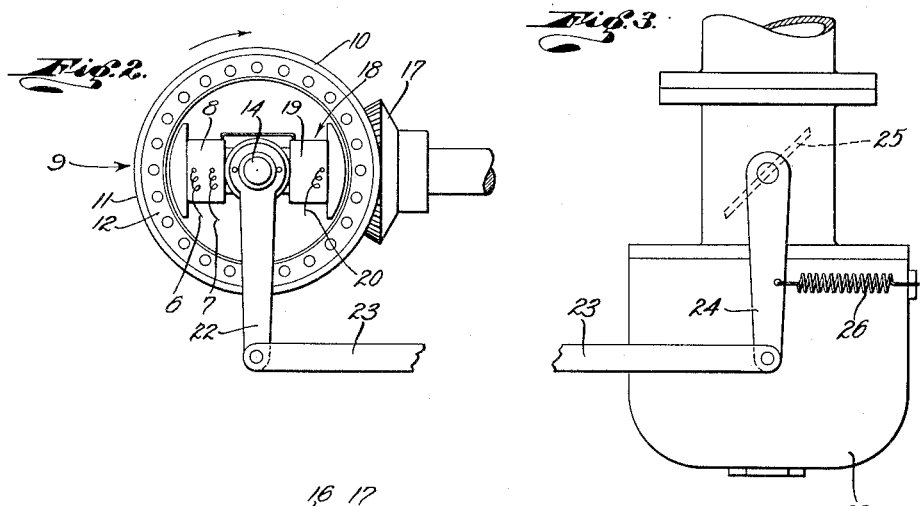
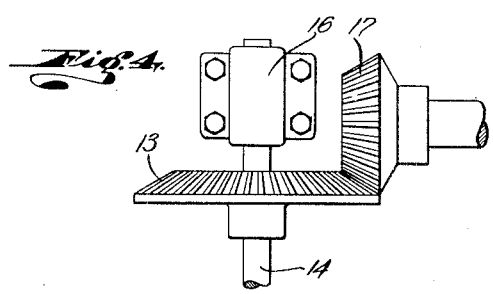
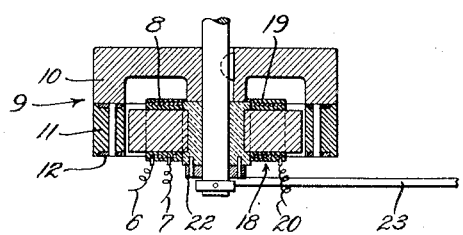
Inventor
OLIN L. DUPY
W E Beatty
Attorney Inventor
OLIN L. DUPY

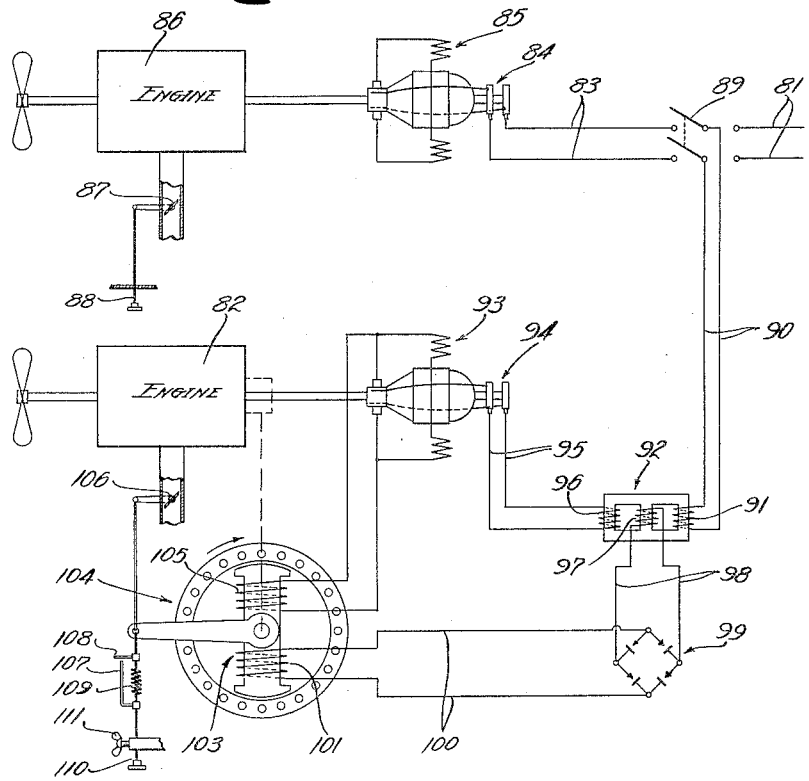
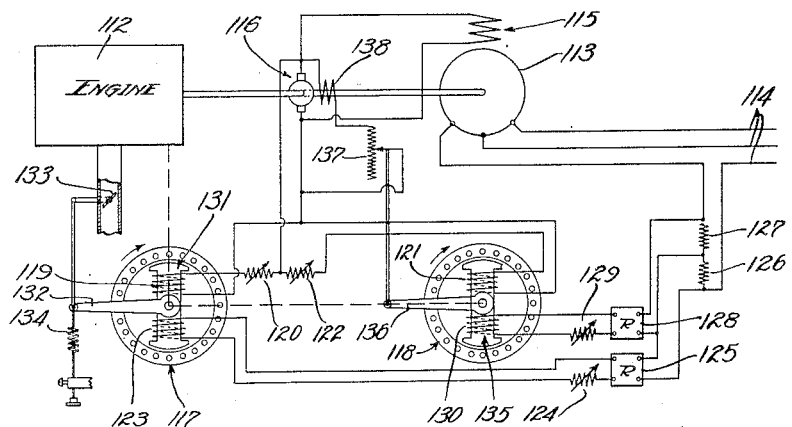

Patented July 8, 1941

2,248,495

UNITED STATES PATENT OFFICE 2,248,495

REGULATOR

Olin L. Dupy, Los Angeles, Calif., assignor of ten per cent to William E. Beatty, Los Angeles, Calif.

Application May 17, 1940, Serial No. 335,712

18 Claims. (Cl. 290—40)

The invention relates generally to an improved regulator and to its use for the regulation of the speed of a prime mover.

One of the difficulties encountered in the design, construction and operation of servo-mechanisms is the electro-magnetic link which is often necessary, in the system, to convert an electrical change into a mechanical movement. If this unit is made large enough to be fairly efficient and produce sufficient mechanical power to overcome friction and give definite positive mechanical movement, we find that the unit is inherently slow in action. An efficient electro-magnetic circuit has high inductance, consequently a large electrical inertia, also it will have a large mass in the moving magnetic structure and consequently a considerable mechanical inertia. This gives us a system that is positive but slow in response to electrical changes. To obtain speed, it has been heretofore necessary to have complicated electrical systems which will produce the proper amount of power to "hold" in the correct position, and which develop many times the "hold" power when a movement to a new position is called for. Such a system is expensive to build and maintain. Consequently most servo-mechanisms now in use are a compromise between efficiency and speed, and call for considerable attention to be paid to the reduction of friction and mass in the design and construction of the mechanism which is to be operated by the servo.

The above difficulties are overcome, according to the present invention, which makes use of a torque motor as the regulating element.

The use of a torque motor as a regulator is disclosed in U. S. Patent Number 796,606 to J. L. Routin patented August 8, 1905, for "Electro mechanical regulator." The torque motor of the present invention is to be distinguished from the one disclosed in the above patent in at least two particulars. In the first place the torque motor of Routin operates solely to measure the off-normal condition, whereas the power to operate the regulating element is derived from an independent source of power, while the torque motor of the present invention not only measures the off-normal condition, but also constitutes the power means which operates the regulating element, so that the regulating element follows the movement or operates by and in accordance with the movement of the floating stator of the torque motor. In the second place, the torque motor of the present invention may be provided with an auxiliary winding so that the operation of the torque motor may be modified in accordance with certain regulating effects. By way of example, the regulation may be obtained (a) from the voltage and/or current of a generator driven by the prime mover, (b) from the phase difference of the prime mover and a constant frequency device and (c) from the phase difference between two alternating currents, one of which is derived from an alternator driven by the prime mover, and the other of which is derived from an independent source such as an alternator driven by a second prime mover, whereby synchronous operation is obtained.

Most speed regulators for engines are caused to function by a change in speed, and the quality of performance of the regulator is judged by how small a change is necessary to produce a correction, and how quickly the correction is completed, and how small the total variation of engine speed is for all operating conditions.

The regulator of the present invention, when used for synchronous operation of the prime mover, does not call for a change in speed to cause it to function. All positions of throttle opening and all power variations produced by the engine controlled by the throttle are effected by a phase shift between an alternating current which is characteristic of the engine's rotation, and a standard independent electrical or mechanical alteration. The operation of the engine is similar to that of an electrical synchronous motor.

In other words, the engine to be regulated will run in syhchronism with the standard, although not in isochronism therewith, and the deviation from isochronism determines the regulating effect.

Accordingly, another object of the invention is to effect regulation through the use of the phase difference between two sets of impulses. While I have shown a torque motor regulator for this purpose, other types of regulators may be employed.

A further object of the invention is to operate a plurality of engines in synchronism over a wide range in speed.

For further details of the invention, reference may be made to the drawings wherein Fig. 1 is a schematic representation of a prime mover and generator provided with the torque motor regulator of this invention.

Fig. 2 is an enlarged elevation of the regulator of Fig. 1.

Fig. 3 is an enlarged elevation of the throttle control of Fig. 1.

Fig. 4 is a plan view, partly in section, of the torque motor of Figs. 1 and 2.

Fig. 7 is a schematic diagram of the invention employed for maintaining synchronous operation of an engine with impulses from a second engine or from a line.

Fig. 8 is a schematic diagram of the invention employed for controlling two characteristics of an engine-driven alternator.

Figure 5:
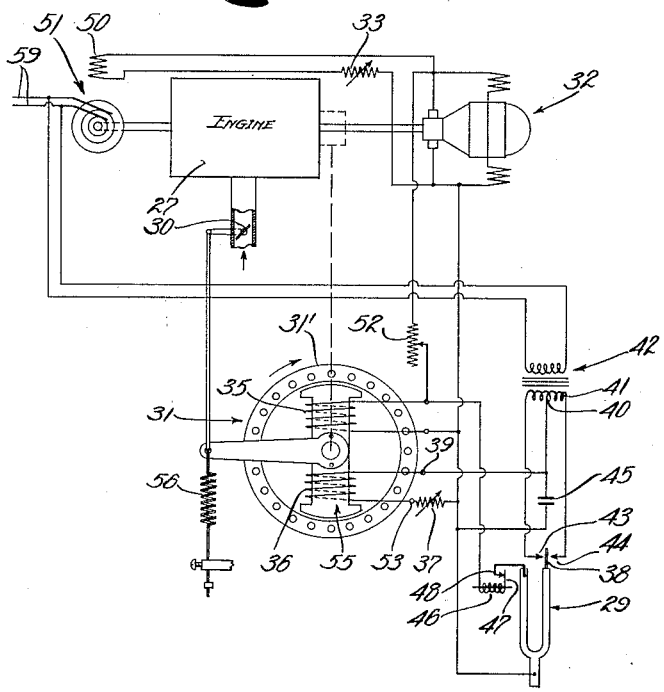
Fig. 5 is a schematic diagram of an arrangement for effecting regulation by the use of the phase differences of impulses, for the purpose of controlling the speed of an engine by a constant frequency device, use being made of the torque motor regulator.

Referring in detail to the drawings, while a gas engine is shown as a typical prime mover, it will be understood that other types of prime movers may be employed instead, also while the torque motor is shown as having a rotating armature and a floating field or stator, it will be understood that these parts may be reversed.

In Fig. 1 the engine 1 is coupled to a D. C. generator 2 having a shunt field 3 and a series field 4. The series field 4 may be used alternatively with the series resistance 5 to provide a potential drop proportional to the current load of generator 2, across the circuit 6, 7 connected to the auxiliary winding 8 (see Fig. 4) of the torque motor regulator 9. The torque motor 9 comprises a rotor 10 having a ring-shaped magnetic circuit 11 with a "squirrel cage" type of short circuited winding 12. The rotor 10 has a gear 13, and both thereof are fixed to a shaft 14 rotatively mounted in bearings 15 and 16. Gear 13 meshes with a pinion 17 driven by the engine 1. The field member 18 is loosely mounted on and floats on the shaft 14. Field member or floating stator 18 not only has the auxiliary winding 8 above described, but also a main winding 19 having a terminal 7 in common with the auxiliary winding 8, and another terminal 20. Terminals 7 and 20 of the main winding are connected to opposite terminals of the generator 2. Fixed to the field member 18 is an arm 22 connected by a link 23 connected to an arm 24 of a throttle valve 25.

The rotor 10 rotates in a clock-wise direction as shown in Fig. 2 and tends to close the throttle 25 which controls the fuel supply to the engine 1, whereas spring 26 connected to arm 24 and to the casing 28 opposes the movement of the field 18 and tends to open throttle 25. The auxiliary winding 8 opposes the main winding 19 and in so doing in effect assists the spring 26 to open the throttle 25. As the field 18 floats on the rotating shaft 14, static friction which might retard the movement of the field 18 is eliminated. The torque developed by the torque motor 9 is balanced against the spring 26 to hold the throttle 25 in proper position for a given voltage of generator 2, and for given load conditions on generator 2.

As shown in Fig. 1 the drop of potential for the auxiliary winding 8 may be obtained from the series resistance 5. This resistance is shown as being variable so as to adjust the effect of the differential field 8, whereby any desired relation between no load and full load voltage of generator 2 may be obtained.

It will be noted that the electrical circuit of the torque motor 9 needs to supply only the field current thereof, and not the power to produce the total force required to operate the throttle 25, such operating force being derived in the main from the engine 1, by reason of the fact that the rotor 10 is driven thereby. By analogy to amplifier circuits, this type of torque unit is in effect a combination of a device measuring the off-normal condition, a power amplifier therefor, and a motor, the amplification factor of which is at least 10 for a small unit, and 50 or more for larger units. Another feature of this type of torque regulator is that the force exerted is the same at any position in the travel of the floating stator 18 and its distance of travel is unlimited, which is not true of any usual moving armature or solenoid type of motor.

The rotor 11 may be a low resistance "squirrel cage" rotor, or a high resistance Shelby steel tubing rotor. By changing the resistance of the rotor, a wide range of operating characteristics can be obtained. In the case of a torque motor 9, the rotor 10 of which is 2.5" in diameter and 1.5" long, in the case of a low resistance armature, at speeds below 300 R. P. M., the torque unit is sensitive to both speed changes and voltage changes, while from 350 R. P. M. to 550 R. P. M. it is sensitive to voltage changes only.

It is of advantage to have the rotor 11 surround the floating stator 18 as in this case a smaller inertia exists for the control than would be the case if these parts were reversed.

By using a generator with poor voltage regulation or even a differentially compound winding, a power plant can be made that runs at a slow speed for full voltage at light loads and at full speed for full voltage at full load. Also spring 26 may be relaxed so that the throttle 25 is held in position for no load idling speed, and with the whole field of the stator 18 in series with all or some of the load current in line 21, this would open the throttle 25 only in proportion to the load in the line 21.

In certain cases it may be desired to hold at a constant value the frequency of an alternator driven by an engine. The regulator of this invention may be employed for that purpose as shown in Fig. 5, wherein the engine 27 drives an alternator 51 which is to supply current of a constant frequency to line 59. In this case, I set the frequency of alternator 51 by means of the tuning fork 29 which is a constant frequency device. The throttle 30 of engine 27 is controlled by a torque motor regulator 31 as described in connection with Figs. 1 to 4. Engine 27 drives a generator 32 which supplies current through a variable resistance 33 to the field winding 50 of the alternator 51. In circuit with winding 36 is a variable resistance 37. The main winding 35 of the regulator 31, is connected across the generator 32, in circuit with a variable resistance 52. Auxiliary winding 36 has its lower terminal 53 connected to the vibrating contact 38 on the tuning fork 29, and the other terminal 39 connected to the mid-point 40 of the secondary winding 41 of a transformer 42, the primary winding of which is connected to the alternator 51. The opposite terminals of the secondary winding 41 terminate in contacts 43 and 44 at opposite sides of contact 38. The condenser 45 is connected as shown in shunt of winding 36. Tuning fork 29 is actuated by the solenoid 46 having a contact 47 cooperating with the contact 48 which vibrates with the tuning fork. The coil 46 and contacts 47 and 48 are in circuit with the tuning fork and with the generator 32 as shown. As in Fig. 1, the windings 35 and 36 are on a floating stator 55 which tends to close throttle 30, due to drag of rotor 31', against the action of spring 56.

In Fig. 5, vibrations of a mechanical vibrating constant frequency device 29, constitute the standard with which the engine 27 is synchronized. The tuning fork 29 is driven at its natural period of vibration by coil 46 which produces a pulsating magnetic pull as the current through it is interrupted by the opening and closing of contacts 47 and 48. An alternating current from transformer 41 is applied to contacts 43 and 44 which alternately make contact with contact 38 which is fixed to the tuning fork 29 and vibrates with it. An electric current will flow through auxiliary winding 36, the character of which will depend upon the phase relation between the alternating electric current from transformer 41 and the periodical opening and closing of the output circuit of transformer 41 by the vibration of contact 38. This current produces a field in the auxiliary winding 36 which aids or bucks the field of the main winding 35. The regulator 31 responds to the difference in phase of the current from alternator 51 and the vibrations of fork 29, and moves throttle 30 to reduce that difference and maintain synchronous operation of engine 27 with the fork 29. In Fig. 5, the main winding 35 is strong enough so that when there is no current in the auxiliary winding 36, it is able to hold the engine 27 near synchronous speed.

Figure 6:
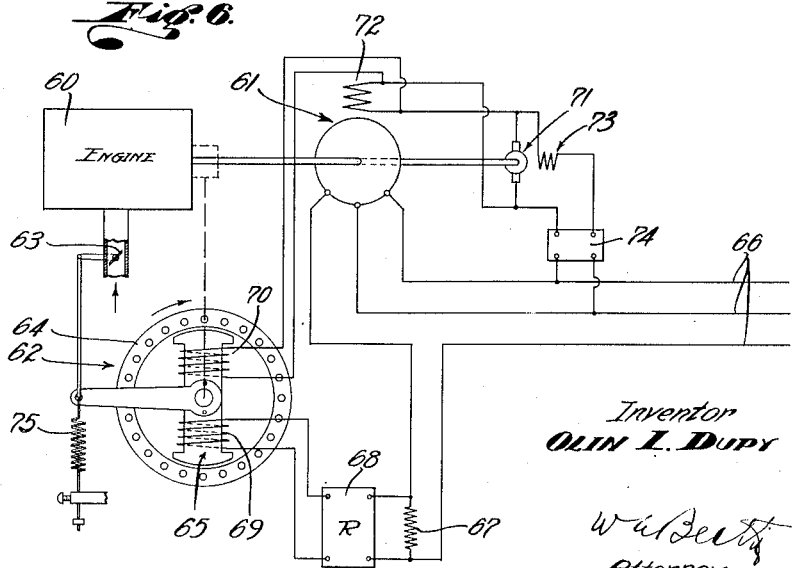
Fig. 6 is a schematic diagram of the torque motor regulator of this invention employed for regulating an alternator driven by an engine.

The arrangement in Fig. 6 is quite similar to the one in Figs. 1 to 4 except that the engine 60 is employed to drive an alternator 61, the torque motor regulator 62 controlling the throttle 63 in response to the circuit conditions of the alternator 61. As in Figs. 1 to 5, the regulator 62 is driven in a clockwise direction by the engine 60 and it comprises a rotor 64 and a floating stator or field member 65. The alternator 61 is illustrated as a three phase machine delivering power to a line 66. In one side of this line, in series therewith is the resistance 67 or the like across which is connected a rectifier 68 which supplies rectified current to the auxiliary field winding 69. Rectifier 68, as is usually the case, has a curved characteristic which assists the regulating action of auxiliary winding 69. The main field winding 70 is connected across the pilot generator 71 which is driven by the engine 60 and which supplies current to the field winding 72 of the alternator 61. The generator 71 has a field winding 73 and the voltage of generator 71 may be controlled by a regulator 74 which is connected across one side of the line 66 to respond to the voltage thereof for the purpose of regulating the current through the field winding 73 to regulate the voltage of generator 71 to thereby regulate the current though field 72 and hence the voltage of alternator 61.

As in Figs. 1 to 4, the torque developed by the torque motor 64 is balanced against the spring 75 to hold the throttle 63 in proper position for a given speed of engine 60 and for given load conditions on alternator 61. As in Fig. 5, variable resistances not shown may be employed in circuit with the windings 69 and 70 to adjust the current there-through, so that any desired relation between no-load and full-load voltage of alternator 61 may be obtained.

Fig. 7 discloses an arrangement for controlling the speed of engine 82 to hold it in synchronism with the alternating current from an independent source such as the A. C. from line 81 or the A. C. from line 83 which is connected to the slip rings 84 of a generator 85 driven by the engine 86. Engine 86 has a throttle 87 having a manual control 88. Current from either line 81 or line 83 is supplied by means of the switch 89 to the line 90 connected to the winding 91 on one branch of a transformer 92. Engine 82 drives a generator 93 having slip rings 94 which supply alternating current over line 95 to winding 96 on an opposite branch of the transformer 92. The middle branch of transformer 92 has a winding 97 which supplies current over line 98 to a rectifier 99, the latter supplying rectified current over line 100 to the auxiliary winding 101 on the floating field member 102 of the torque motor regulator 104. The main winding 105 on the floating field 103 is connected across the D. C. side of generator 93. Engine 82 is provided with a throttle 106, mechanically connected to the field member 103 as described in connection with Figs. 1 to 6. For manual control of the throttle 106, I provide a push-rod 107 which bears against a projection 108, mechanically in shunt to the spring 109, when the throttle handle 110 is pushed upwardly. The screw 111 provides means for holding the control 110 in adjusted position, and for adjusting the tension of spring 109.

In Fig. 7 the main winding 105 is strong enough so that when there is no current in the auxiliary winding 101, it is able to throttle the engine 82 below synchronous speed. Preferably, the field produced by the auxiliary winding 101 always bucks the field produced by the main winding 105.

In Fig. 7, the current from transformer 92 to the rectifier 99 depends upon the phase relation between the currents in lines 90 and 95. When both of these currents are exactly in phase, maximum current is fed to the rectifier 99 and in turn, this causes the regulator 104 to tend to speed up the engine 82 driving the generator 93. Thereupon the A. C. from generator 82 shifts ahead in phase with respect to the A. C. from line 90, thereby reducing the current fed by rectifier 99 to the auxiliary winding 101, thereby reducing the tendency of the regulator 104 to speed up the engine 82. An increase of load on engine 82 tends to slow it down, thereby causing the A. C. from generator 93 to shift in phase behind the A. C. from generator 85. This will increase the current to the rectifier 99 and to the winding 101 and tend to speed up engine 82 to a point of stability.

Conversely, a decrease of load on engine 82 will tend to increase its speed and this causes the A. C. from generator 93 to start to shift in phase ahead of the A. C. of generator 85. This will decrease the current to the rectifier 99 and to the winding 101 and tend to decrease the speed of engine 82 to a point of stability. This action continues until a point of stability is reached where the throttle 106 is at the exact opening necessary to hold the speed of engine 82 in synchronism with the speed of engine 86, if switch 89 is thrown to the left, or in synchronism with whatever source of alternating current is connected to line 81.

In Fig. 7, the throttle control may be manually operated to change the speed of engine 86 over a wide range, and the regulator 104 will cause engine 82 to follow engine 86 in synchronism.

The effect of the regulation in Fig. 7 is such that the field produced by the direct current in winding 101 is added to or subtracted from the field produced by coil 105, the resultant field causing the torque motor 104 to move the throttle 106 from a position that causes the engine 82 to run at or near synchronous speed, to that position which will cause engine 82 to run at exact synchronous speed.

In Fig. 7 the main winding 105 and its function may be omitted and all regulation may be accomplished by the auxiliary winding 101.

In Fig. 8 the engine 112 drives a three phase alternator 113 connected to a line 114. Alternator 113 has a field winding 115 supplied with current from a D. C. generator 116 also driven by engine 112. In this case, the engine 112 drives two torque motor regulators, 117 and 118. The main winding 119 of regulator 117 is connected through a variable resistance 120 across generator 116, while the main winding 121 of regulator 118 is connected through a variable resistance 122 across generator 116. The auxiliary winding 123 of regulator 119 is supplied with current through a variable resistance 124 from rectifier 125, the in-put of which is connected across resistance 126 in series with one side of line 114. Similarly, the series resistance 127 supplies a potential drop to the in-put of rectifier 128 which supplies current through a variable resistance 129 to the auxiliary winding 130 of regulator 118.

The floating field member 131 of regulator 117, as in Figs. 1 to 6, carries an arm 132 which tends to close throttle 133 against the action of spring 134.

The field member 135 of regulator 118 carries an arm 136 which operates a variable resistance 137 in circuit with the field winding 138 of generator 116.

In Fig. 8, the resistances 120 and 124 are adjusted to give optimum performance of regulator 117 for control of throttle 133, while resistances 122 and 129 are adjusted for optimum performance for operation of field rheostat 137 for voltage control of alternator 113.

In Fig. 8, regulator 117 and its function may be omitted, use being made only of regulator 118 to control the alternator 113. Also regulator 118 may control only the voltage of alternator 113, auxiliary winding 130 and its function being omitted. It will be apparent to those skilled in the art, that various other modifications may be made in the invention without departing from the spirit of the following claims.

I claim:

1. The combination of a prime mover, a generator driven thereby, a regulator comprising a torque motor connected to be energized by said generator and having a rotor and a floating stator, means for driving said rotor at a speed which is characteristic of the speed of said prime mover, a speed control for said prime mover, and means operating said speed control by and in accordance with the movement of said floating stator, said torque motor comprising both the means for measuring the off-normal condition and the power means constituting the actuating force for operating said speed control.

2. The combination of a prime mover, a generator driven thereby, a regulator comprising a torque motor connected to be energized by said generator and having a rotor and a floating stator, means for driving said rotor at a speed which is characteristic of the speed of said prime mover, a speed control for said prime mover, means urging said speed control in one direction, and a mechanical connection between said floating stator and said speed control for urging said speed control in the opposite direction.

3. The combination of a prime mover, a generator driven thereby, a regulator comprising a torque motor connected to be energized by said generator and having a rotor and a floating stator, means for driving said rotor at a speed which is characteristic of the speed of said prime mover, a speed control for said prime mover, means operating said speed control by and in accordance with the movement of said floating stator an auxiliary winding on said torque motor, and a control circuit for said winding.

4. The combination according to claim 3 wherein said control circuit is in circuit with said generator.

5. The combination according to claim 3 wherein said generator is an A. C. generator and wherein said control circuit comprises a constant frequency device, and means for energizing said auxiliary winding in accordance with the difference in phase of current from said generator and said constant frequency device.

6. The combination according to claim 3 wherein said generator is an A. C. generator, and wherein said control circuit comprises a constant speed device and means for energizing said auxiliary winding in accordance with the phase difference between said A. C. generator and said constant speed device.

7. The combination of a master engine, a second engine, a speed control for each of said engines, an A. C. generator driven by each of said engines, a torque motor driven by said second engine and connected to the speed control therefor and having a main winding connected to the generator for said second engine and an auxiliary winding, and means responsive to the difference in phase of said generators for energizing said auxiliary winding.

8. Means for operating a plurality of engines in synchronism at various speeds comprising means for manually changing the speed of one engine, a regulator for the speed of another engine, means for translating the difference in speed of said engines into electrical impulses, and means for controlling said regulator by the phase difference of said impulses.

9. The combination of an engine, a speed control therefor, a torque motor regulator for said speed control and having a winding, a generator of A. C. driven by said engine, an independent source of A. C., means for rectifying current from said generator and from said source, and a circuit connecting said rectifying means and said winding.

10. The combination according to claim 9 wherein said independent source of A. C. comprises a second engine and a generator of A. C. driven thereby.

11. Means for regulating the speed of one engine to synchronism with another engine comprising means for translating the speed of each of said engines into electrical impulses, and means constantly responsive to the phase difference of said impulses and regulating the speed of said first engine.

12. The combination of a prime mover, a speed control therefor, a generator driven thereby, a regulator comprising a torque motor having a floating stator and a rotor, means for energizing said torque motor in accordance with the voltage of said generator, and means operating said speed control by and in accordance with the movement of said floating stator.

13. The combination according to claim 12 comprising means for causing a change in the energizing force of said torque motor in accordance with the load on said generator.

14. The combination according to claim 12 comprising means for producing independent pulsations, and means for varying the energizing force of said torque motor in accordance with the phase difference of electrical impulses characteristic of the speed of said engine and said independent pulsations.

15. The combination according to claim 12 wherein said rotor surrounds said floating stator.

16. The combination of a prime mover, a generator driven thereby, a regulator for said engine, said regulator comprising a torque motor having windings and a floating stator and a rotor, and a plurality of means for energizing said windings, one of said last mentioned means comprising means responsive to the load on said generator.

17. Means for regulating the speed of one engine to synchronism with another engine, comprising means for translating the speed of each of said engines into electrical impulses, and means responsive to the vectorial sum of the impulses from said engines for regulating the speed of said first engine.

18. The combination of a prime mover, a generator driven thereby, a speed control for said prime mover, a regulator comprising a squirrel cage rotor, a floating stator having a field winding surrounded by said rotor, means for energizing said winding from said generator, and an operating connection between said regulator and said floating stator.

OLIN L. DUPY.